(12) United States Patent
Ho et al.

(10) Patent No.: US 8,168,058 B2
(45) Date of Patent: May 1, 2012

(54) METHOD FOR MANUFACTURING A LITHIUM PHOSPHATE THIN FILM

(75) Inventors: Wen-Hsien Ho, Keelung (TW);
Shiow-Kang Yen, Taichung (TW);
Han-Chang Liu, Miaoli County (TW);
Ching Fei Li, Chiayi County (TW)

(73) Assignee: Taiwan Textile Research Institute, Tu-Chen City, Taipei Hsien (TW)

( * ) Notice: Subject to any disclaimer, the term of this patent is extended or adjusted under 35 U.S.C. 154(b) by 714 days.

(21) Appl. No.: 12/345,925

(22) Filed: Dec. 30, 2008

(65) Prior Publication Data

US 2010/0155249 A1  Jun. 24, 2010

(30) Foreign Application Priority Data

Dec. 22, 2008 (TW) ................. 97150087 A

(51) Int. Cl.
*C25D 11/36* (2006.01)
(52) U.S. Cl. ...................... 205/224; 205/318
(58) Field of Classification Search .............. 205/50, 205/224, 318
See application file for complete search history.

(56) References Cited

U.S. PATENT DOCUMENTS

| 6,344,128 B1* | 2/2002 | Toledo et al. ............... 205/260 |
| 7,959,784 B2* | 6/2011 | Balagopal et al. ............ 205/450 |
| 2004/0151649 A1* | 8/2004 | Hemmer et al. .............. 423/306 |
| 2007/0092786 A1* | 4/2007 | Zhou .............................. 429/44 |
| 2008/0138709 A1* | 6/2008 | Hatta et al. .................... 429/221 |

FOREIGN PATENT DOCUMENTS

JP   6-349502   * 12/1994

OTHER PUBLICATIONS

Kyoo-Seung Han et al, "Direct Electroplating of Lithium Cobalt Oxide Film on Platinum Substrate in 100°-200° C Aqueous Solution", J. Am. Ceram. Soc. vol. 85, No. 10, Oct. 2002, pp. 2444-2448.*
NOAA, National Weather Service, Current Weather Conditons: Ocean City Municipal Airport, http://weather.noaa.gov/weather/current/KOXB.html, Oct. 1, 2011.*

* cited by examiner

*Primary Examiner* — Patrick Ryan
*Assistant Examiner* — William Leader
(74) *Attorney, Agent, or Firm* — Thomas, Kayden, Horstemeyer & Risley, LLP

(57) ABSTRACT

An electrochemical method for manufacturing a lithium phosphate ($Li_3PO_4$) thin film includes preparing an electroplating solution and forming the lithium phosphate thin film on a conductive substrate under suitable conditions. The electroplating bath includes about $10^{-2}$ M to about $10^{-1}$ M lithium ion and about $10^{-2}$ M to about 1 M monohydrogen phosphate ion ($HPO_4^{2-}$) or dihydrogen phosphate ion ($H_2PO_4^-$).

15 Claims, No Drawings

METHOD FOR MANUFACTURING A LITHIUM PHOSPHATE THIN FILM

RELATED APPLICATIONS

This application claims priority to Taiwan Application Serial Number 97150087, filed Dec. 22, 2008, which is herein incorporated by reference.

BACKGROUND

1. Field of Invention

The present invention relates to lithium phosphate thin film and method for manufacturing the same. More particularly, the present invention relates to an electrochemical method for manufacturing lithium phosphate thin film.

2. Description of Related Art

Lithium ion secondary battery has been widely used in consumer electronics and high power electronics because it is light in weight, high in electromotive force, and high in energy density. Lithium ion secondary battery includes high power lithium battery, high capacity lithium battery, and thin film lithium battery. Thin film lithium battery is thin, flexible, and printable can be used as a flexible driving power source for IC card, flexible electronic devices and medical electronics.

Thin film lithium battery includes solid-state thin film battery and organic radical battery. Solid-state thin film battery employs lithium phosphorus matrix (metal- or nitrogen-doped $Li_3PO_4$) thin film as solid electrolyte and thus has many advantages over other lithium secondary batteries. First, solid electrolyte of solid-state thin film battery does not exhibit the problem of electrolyte leakage of liquid electrolyte. Besides, the thickness of solid-state thin film battery is less 10 μm and thus can be manufactured into any desirable size and shape. Moreover, solid-state thin film battery has high power density and excellent charge/discharge cycle performance.

Presently, lithium phosphorus matrix thin films are manufactured by physical sputtering techniques such as RF magnetron sputtering. However, in most sputtering systems, the deposition rate is slow. For example, in RF magnetron sputtering, the deposition rate is about 170 Angstroms per minute. In other words, it cost nearly an hour to obtain a film with 1 μm thickness. The long processing time per deposition cycle leads to high manufacturing cost of solid electrolyte.

In view of the foregoing, there is a need to provide a method for manufacturing solid electrolyte that is faster and simpler than prior art.

SUMMARY

In one aspect, the present invention is directed to a lithium phosphate ($Li_3PO_4$) thin film and an electrochemical method for manufacturing the same. As compare with physical sputtering, said electrochemical method is much simpler and requires less deposition time.

According to embodiments of the present invention, the electrochemical method for manufacturing lithium phosphate thin film includes the procedure of preparing an electrodeposition solution, immersing a conductive substrate into the electrodeposition solution and electrodepositing the lithium phosphate thin film on the conductive substrate under suitable parameters, and drying the lithium phosphate thin film with a drying temperature of about 15-40° C. and a relative humidity of at least about 75%.

Said electrodeposition solution comprises about $10^{-2}$ M to about $10^{-1}$ M lithium ion and about $10^{-2}$ M to about 1 M monohydrogen phosphate ion ($HPO_4^{2-}$) or dihydrogen phosphate ion ($H_2PO_4^-$).

Said suitable parameters include: an Ag/AgCl reference electrode; an electrodeposition voltage of about 950-1150 mV; and an electrodeposition time about 5-10 minutes.

The lithium phosphate thin film obtained according to the embodiments of the present invention has a conductivity of at least $5*10^{-8}$ S/cm at 23-27° C. The lithium phosphate thin film can be used as a solid electrolyte of lithium secondary battery In another aspect, the present invention is directed to an iron-doped lithium phosphate ($Li_{3-3x}Fe_xPO_4$) thin film and an electrochemical method for manufacturing the same. Similarly, as compare with physical sputtering, said electrochemical method is much simpler and requires less deposition time.

According to embodiments of the present invention, the electrochemical method for manufacturing a lithium iron phosphate thin film includes the procedure of preparing an electrodeposition solution, immersing a conductive substrate in the electrodeposition solution and electrodepositing the lithium iron phosphate thin film on the conductive substrate under suitable parameters, and drying the lithium iron phosphate thin film with a drying temperature of about 15-40° C. and a relative humidity of at least about 75%.

Said electrodeposition solution comprises about $10^{-2}$ M to about $10^{-1}$ M lithium ion, about $10^{-2}$ M to about 1 M monohydrogen phosphate ion ($HPO_4^{2-}$) or dihydrogen phosphate ion ($H_2PO_4^-$), and about $10^{-3}$ M to about $5*10^{-3}$ M iron ion or ferrous ion.

Said suitable parameters include: an Ag/AgCl reference electrode; an electrodeposition voltage of about 750-850 mV; and an electrodeposition time about 2-10 minutes.

The iron-doped lithium phosphate thin film obtained according to the embodiments of the present invention has a conductivity of at least $5*10^{-8}$ S/cm at 23-27° C. The iron-doped lithium phosphate thin film can be used as a solid electrolyte of lithium secondary battery.

It is to be understood that both the foregoing general description and the following detailed description are by examples, and are intended to provide further explanation of the invention as claimed.

DETAILED DESCRIPTION

Reference will now be made in detail to the present embodiments of the invention. First, embodiments for manufacturing lithium phosphate thin film and iron-doped lithium phosphate thin film and preparation examples thereof are illustrated. Then, properties and conductivity of the thin films of some preparation examples are investigated.

(I) Electrochemical Method for Manufacturing Lithium Phosphate Thin Film

In one aspect, the present invention is directed to a lithium phosphate ($Li_3PO_4$) thin film and an electrochemical method for manufacturing the same.

According to embodiments of the present invention, the electrochemical method for manufacturing lithium phosphate thin film includes the procedure of preparing an electrodeposition solution, immersing a conductive substrate in the electrodeposition solution and electrodepositing the lithium phosphate thin film on the conductive substrate under suitable parameters, and drying the lithium phosphate thin film.

According to embodiments of the present invention, said electrodeposition solution comprises about $10^{-2}$ M to about $10^{-1}$ M lithium ion and about $10^{-2}$ M to about 1 M monohydrogen phosphate ion ($HPO_4^{2-}$) or dihydrogen phosphate ion ($H_2PO_4^-$). As an example, but not as a limitation, the lithium ion can be provided by about $10^{-2}$ M to about $10^{-1}$ M lithium nitrate aqueous solution, and said dihydrogen phosphate ion can be provided by about $10^{-2}$ M to about 1 M ammonium dihydrogen phosphate aqueous solution.

For the purpose of illustration but not restriction, lithium ions and dihydrogen phosphate ions in the electrodeposition solution may undergo the following reactions and thus form the lithium phosphate thin film on the conductive substrate (working electrode):

$$H_2PO_4^- + 2e^- \rightarrow PO_4^{3-} + H_2$$

$$3Li^+ + PO_4^{3-} \rightarrow Li_3PO_4$$

According to embodiments of the present invention, said electrodeposition process is carried on at room temperature (about 23-27° C.). Besides, the electrodeposition solution can be stirred during the electrodeposition process, and the lithium ion and phosphate ion should be timely supplemented to maintain required concentration thereof.

According to embodiments of the present invention, parameters for electrodeposition of lithium phosphate thin film include: an Ag/AgCl reference electrode; a platinum counter electrode; an electrodeposition voltage of about 950-1150 mV; an electrodeposition time about 5-10 minutes, and a working distance of about 1-10 cm.

According to embodiments of the present invention, said conductive substrate can be a conductive fabric, a transparent conductive substrate, a metal substrate, or a metal oxide substrate. As an example, but not as a limitation, the conductive fabric can be made from conjugated polymers or metallic firbes/yarns; the transparent conductive substrate can be a fluorine-doped tin oxide/glass (FTO/glass) substrate, an indium tin oxide/glass (ITO/glass) substrate, or an ITO/polyethylene naphthalate (ITO/PEN) flexible substrate; and metal substrate can be a platinum substrate or a stainless steel substrate.

According to embodiments of the present invention, suitable drying temperature is about 15-40° C. and relative humidity is at least about 75%. In some preparation examples of the present invention, the lithium phosphate thin film was dried in a constant temperature and humidity apparatus, and the drying temperature used was about 40° C. and the relative humidity used was about 85%.

According to other embodiments of the present invention, the lithium phosphate thin film can be heat-treated at about 150-200° C. after the drying step. The heat treating step can be carried on several stages. For example, the thermally heating step can include a first heating stage, a second heating stage, and a cooling stage. Specifically, in the first heating stage, the lithium iron phosphate thin film is heated from 23-27° C. to about 70-100° C. at a first heating rate of about 2° C. per minute for about 60-180 minutes; in the second heating stage, the lithium iron phosphate thin film is further heated to about 150-200° C. at a second heating rate of about 2° C. per minute for about 60-180 minutes; and in the cooling stage, the lithium iron phosphate thin film is cooled to about 23-27° C. at a cooling rate of about 2° C. per minute.

As will occur to those skilled in the art, the temperature of heat-treatment depend on the conductive substrate used. For example, with respect to flexible substrates, the temperature of heat-treatment should not exceed 300° C. and preferably should not exceed 150° C.

In the above-mentioned embodiments, the film deposition rate is about 0.1-0.2 μm per minute. In other words, it only takes 5-10 minutes to obtain a lithium phosphate thin film of 1 μm thick which is much faster than prior art.

(II) Preparation Examples of Lithium Phosphate Thin Film and Property Analysis

In the following preparation examples, some processing parameters were altered according to the embodiments of the present invention to manufacture lithium phosphate thin films. The altered parameter(s) of each example are indicated in Table 1. Fixed processing parameters include working distance of about 5 cm, platinum working electrode, and drying temperature of about 40° C. and relative humidity about 85%.

In addition, the thickness and bulk resistance (Rb) of the lithium phosphate thin film were measured to calculate the conductivity (σ) of lithium phosphate thin film, and the results are shown in Table 1. A Potentiostat/Galvanostat (EG&G Princeton Applied Research Model 273) in conjunction with a lock-in amplifier (EG&G PAR model 5210) were used to perform AC impedance analysis to measure the thickness and the bulk resistance of the film. Then, the conductivity of the film at room temperature (about 23-27° C.) was calculated from the formula:

$$\sigma = (d/A)/Rb$$

where
σ=conductivity
Rb=bulk resistance
A=area of the sample
d=coating thickness

TABLE 1

|  | $LiNO_3$ (M) | $(NH_4)H_2PO_4$ (M) | Voltage (mV) | Time (min) | Temperature (° C.) | d (μm) | Rb (Ω) | σ (S/cm) |
| --- | --- | --- | --- | --- | --- | --- | --- | --- |
| example 1 | $2*10^{-2}$ | $2*10^{-2}$ | 1000 | 7.5 | 290 | 1 | 1209 | $8.62*10^{-8}$ |
| example 2 | $2*10^{-2}$ | $2*10^{-2}$ | 1000 | 10 | 290 | 1.5 | 1120 | $9.00*10^{-8}$ |
| example 3 | 0.5 | $2*10^{-2}$ | 1000 | 10 | 290 | 1.5 | 1106 | $9.04*10^{-8}$ |
| example 4 | 0.5 | $2*10^{-2}$ | 1000 | 10 | 500 | 1.5 | 36550 | $2.74*10^{-9}$ |
| example 5 | $10^{-1}$ | $10^{-1}$ | 1000 | 7.5 | 290 | 1.5 | 1300 | $7.45*10^{-8}$ |

The only parameter altered between example 1 and example 2 is the electrodeposition time, and as the electrodeposition time increases so does the thickness of the resultant lithium phosphate thin film. The electrodeposition time of example 2 is 10 minutes and the thickness of the lithium phosphate thin film is about 1.5 μm, and thus the conductivity of example 2 ($9.00*10^{-8}$ S/cm) is better than that of example 1 ($8.62*10^{-8}$ S/cm).

Besides, as can be appreciated from example 3 and example 4, the temperature of heat-treatment would also affect the conductivity of the lithium phosphate thin film. When the temperature of heat-treatment is elevated from about 300° C. to about 500° C., the conductivity of the lithium phosphate thin film decrease from about $9.04*10^{-8}$ S/cm (example 3) to about $2.74*10^{-9}$ S/cm (example 4).

Commercially available lithium phosphate thin film has a conductivity of about $2.4*10^{-8}$ S/cm at room temperature (about 23-27° C.). As can be seen in table 1, all the lithium phosphate thin film of examples 1-5 have better conductivity than the commercially available film.

Therefore, embodiments of the present invention provide a lithium phosphate thin film having a conductivity of at least about $5*10^{-8}$ S/cm and a thickness of at least about 1-1.5 μm.

(III) Electrochemical Method for Manufacturing Iron-Doped Lithium Phosphate Thin Film In another aspect, the present invention is directed to an iron-doped lithium phosphate thin film and an electrochemical method for manufacturing the same.

According to embodiments of the present invention, the electrochemical method for manufacturing an iron-doped lithium phosphate thin film includes the procedure of preparing an electrodeposition solution, immersing a conductive substrate into the electrodeposition solution and electrodepositing the iron-doped lithium phosphate thin film on the conductive substrate under suitable parameters, and drying the iron-doped lithium phosphate thin film with a drying temperature of about 15-40° C. and a relative humidity of at least about 75%.

selection of the conductive substrate, drying condition, and the heat-treatment parameters are similar to those described with respect to the manufacture of lithium phosphate thin film and thus will not be described in detail in this aspect.

Similarly, in the above-mentioned embodiments, the film deposition rate of iron-doped lithium phosphate thin film is about 0.1-0.2 μm per minute. In other words, it only takes 5-10 minutes to obtain an iron-doped lithium phosphate thin film with 1 μm thickness which is much faster than prior art.

(IV) Preparation Examples of Lithium Iron Phosphate Thin Film and Property Analysis In the following preparation examples, some processing parameters were altered according to the embodiments of the present invention to manufacture iron-doped lithium phosphate thin films. The altered parameter(s) of each example are indicated in Table 2. Fixed processing parameters include working distance of about 5 cm, platinum working electrode, and drying temperature of about 40° C. and relative humidity about 85%.

In addition, the thickness and bulk resistance (Rb) of the iron-doped lithium phosphate thin film were measured to calculate the conductivity (σ) of iron-doped lithium phosphate thin film in accordance with the methods described above, and the results are shown in Table 2.

TABLE 2

| | $LiNO_3$ (M) | $(NH_4)H_2PO_4$ (M) | $Fe(NH_4)_2SO_4$ (M) | Voltage (mV) | Time (min) | Temperature (° C.) | d (μm) | Rb (Ω) | σ (S/cm) |
|---|---|---|---|---|---|---|---|---|---|
| example 6 | $5*10^{-1}$ | $2*10^{-2}$ | $1*10^{-3}$ | 850 | 5 | 190 | 0.5 | 240 | $2.86*10^{-7}$ |
| example 7 | $2*10^{-2}$ | $2*10^{-2}$ | $1*10^{-3}$ | 850 | 5 | 190 | 0.5 | 259 | $1.77*10^{-7}$ |
| example 8 | $2*10^{-2}$ | $2*10^{-2}$ | $2*10^{-3}$ | 850 | 5 | 190 | 0.5 | 402 | $6.02*10^{-8}$ |
| example 9 | $5*10^{-1}$ | $2*10^{-2}$ | $1*10^{-3}$ | 850 | 10 | 190 | 1.0 | 225 | $5.01*10^{-7}$ |

According to embodiments of the present invention, said electrodeposition solution comprises about $10^{-2}$ M to about $10^{-1}$ M lithium ion, about $10^{-2}$ M to about 1 M monohydrogen phosphate ion ($HPO_4^{2-}$) or dihydrogen phosphate ion ($H_2PO_4^-$), and about $5*10^{-3}$ M to about 5*10-3 M iron ion or ferrous ion. As an example, but not as a limitation, the lithium ion can be provided by about $10^{-2}$ M to about $10^{-1}$ M lithium nitrate aqueous solution, said dihydrogen phosphate ion can be provided by about $10^{-2}$ M to about 1 M ammonium dihydrogen phosphate aqueous solution, and said iron ion or ferrous ion can be provided by about $10^{-3}$ M to about $5*10^{-3}$ M ferrous ammonium sulfate aqueous solution.

For the purpose of illustration but not restriction, lithium ions and dihydrogen phosphate ions in the electrodeposition solution may undergo the reactions described above and iron ions are doped into the lithium phosphate thin film to form the iron-doped lithium phosphate ($Li_{3-3X}Fe_XPO_4$) thin film.

According to embodiments of the present invention, said electrodeposition process is carried on at room temperature (about 23-27° C.). Besides, the electrodeposition solution can be stirred during the electrodeposition process, and the lithium ion and phosphate ion should be timely supplemented to maintain required concentration thereof.

According to embodiments of the present invention, parameters for electrodeposition of iron-doped lithium phosphate thin film include: an Ag/AgCl reference electrode; a platinum counter electrode; an electrodeposition voltage of about 750-850 mV; an electrodeposition time about 2-10 minutes, and a working distance of about 1-10 cm.

When manufacturing iron-doped lithium phosphate thin film according to this aspect of the present invention, the The only parameter altered between example 6 and example 9 is the electrodeposition time, and as the electrodeposition time increases so does the thickness of the resultant iron-doped lithium phosphate thin film. The electrodeposition time of example 9 is 10 minutes and the thickness of the iron-doped lithium phosphate thin film is about 1.0 μm, and thus the conductivity of example 2 ($5.01*10^{-7}$ S/cm) is better than that of example 6 ($2.86*10^{-7}$ S/cm).

By comparing example 6 with example 3 of table 1 it is observed that when other processing parameters are the same, the addition of ferrous irons in the electrodeposition solution significantly improved the conductivity of the result film. More specifically, the lithium iron phosphate thin film of example 6 has a conductivity of about $2.86*10^{-7}$ S/cm, which is much higher than the conductivity of the lithium phosphate thin film of example 3 ($9.04*10^{-8}$ S/cm).

Although the addition of iron can improve the conductivity of the resultant thin film, the iron content of the iron-doped lithium phosphate thin film should be carefully controlled. Take example 7 and 8 for example, the molar concentration of iron ion is example 8 is higher than that of the example 7; however, the conductivity of example 8 ($6.02*10^{-8}$ S/cm) is lower than the conductivity of example 7 ($1.77*10^{-7}$ S/cm).

As previously stated, commercially available lithium phosphate thin film has a conductivity of about $2.4*10^{-8}$ S/cm at room temperature (about 23-27° C.). It can be seen in table 2 that all the iron-doped lithium phosphate thin film of examples 6-9 have better conductivity than the commercially available film.

Therefore, embodiments of the present invention provide a iron-doped lithium phosphate thin film having a conductivity of at least about $5*10^{-8}$ S/cm and a thickness of at least about 0.5-1.0 μm.

Moreover, element analysis was conducted to determine the molar ratio of lithium to iron of iron-doped lithium phosphate thin films of examples 6-9. The result of example 6 is shown in table 3. According to this example, the molar ratio of lithium to iron of the iron-doped lithium phosphate thin film is about 12:1.

TABLE 3

|  | Li | Fe |
|---|---|---|
| (ppm) | 16.10 | 11.00 |
| (mole) | 2.32 | 0.20 |

Therefore, embodiments of the present invention provide a iron-doped lithium phosphate thin film having a conductivity of at least about $5*10^{-8}$ S/cm and a thickness of at least about 1-1.5 μm.

In yet another aspect of the present invention, it is directed to the application of said lithium phosphate thin film and said iron-doped lithium phosphate thin film. According to embodiments of the present invention, said lithium phosphate thin film and said iron-doped lithium phosphate thin film can be used as solid electrolyte of lithium secondary battery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrochemical method for manufacturing a lithium phosphate thin film, comprising:
   preparing an electrodeposition solution comprising about $10^{-2}$ M to about $10^{-1}$ M lithium ion and about $10^{-2}$ M to about 1 M monohydrogen phosphate ion ($HPO_4^{2-}$) or dihydrogen phosphate ion ($H_2PO_4^{-}$);
   immersing a conductive substrate in the electrodeposition solution and electrodepositing the lithium phosphate thin film on the conductive substrate under following parameters: an Ag/AgCl reference electrode; an electrodeposition voltage of about 950-1150 mV; and an electrodeposition time about 5-10 minutes;
   drying the lithium phosphate thin film with a drying temperature of about 15-40° C. and a relative humidity of at least about 75%;
   heating the lithium phosphate thin film from 23-27° C. to about 70-100° C. at a first heating rate of about 2° C. per minute for about 60-180 minutes;
   heating the lithium phosphate thin film to about 150-500° C. at a second heating rate of about 2° C. per minute for about 60-180 minutes; and
   cooling the lithium phosphate thin film to about 23-27° C. at a cooling rate of about 2° C. per minute.

2. The electrochemical method for manufacturing a lithium phosphate thin film of claim 1, wherein the electrodeposition solution comprises about $10^{-2}$ M to about $10^{-1}$ M lithium nitrate aqueous solution.

3. The electrochemical method for manufacturing a lithium phosphate thin film of claim 1, wherein the electrodeposition solution comprises about $10^{-2}$ M to about $10^{-1}$ M ammonium dihydrogen phosphate aqueous solution.

4. The electrochemical method for manufacturing a lithium phosphate thin film of claim 1, wherein the drying temperature is about 40° C. and the relative humidity is about 85%.

5. The electrochemical method for manufacturing a lithium phosphate thin film of claim 1, wherein the conductive substrate is a conductive fabric, a transparent conductive substrate, a metal substrate, or a metal oxide substrate.

6. The electrochemical method for manufacturing a lithium phosphate thin film of claim 5, wherein the transparent conductive substrate is an FTO/glass substrate, an ITO/glass substrate, or an ITO/PEN substrate.

7. The electrochemical method for manufacturing a lithium phosphate thin film of claim 5, wherein the metal substrate is a platinum substrate or a stainless steel substrate.

8. An electrochemical method for manufacturing an iron-doped lithium phosphate thin film, comprising
   preparing an electrodeposition solution comprising about $10^{-2}$ M to about $10^{-1}$ M lithium ion, about $10^{-2}$ M to about 1 M monohydrogen phosphate ion ($HPO_4^{2-}$) or dihydrogen phosphate ion ($H_2PO_4^{-}$), and about $10^{-3}$ M to about $5*10^{-3}$ M iron ion or ferrous ion;
   immersing a conductive substrate in the electrodeposition solution and electrodepositing the iron-doped lithium phosphate thin film on the conductive substrate under following parameters: an Ag/AgCl reference electrode; an electrodeposition voltage of about 750-850 mV; and an electrodeposition time about 2-10 minutes;
   drying the iron-doped lithium phosphate thin film with a drying temperature of about 15-40° C. and a relative humidity of at least about 75%;
   heating the lithium phosphate thin film from 23-27° C. to about 70-100° C. at a first heating rate of about 2° C. per minute for about 60-180 minutes;
   heating the lithium phosphate thin film to about 150-500° C. at a second heating rate of about 2° C. per minute for about 60-180 minutes; and
   cooling the lithium phosphate thin film to about 23-27° C. at a cooling rate of about 2° C. per minute.

9. The electrochemical method for manufacturing an iron-doped lithium phosphate thin film of claim 8, wherein the electrodeposition solution comprises about $10^{-2}$ M to about $10^{-1}$ M lithium nitrate aqueous solution.

10. The electrochemical method for manufacturing an iron-doped lithium phosphate thin film of claim 8, wherein the electrodeposition solution comprises about $10^{-2}$ M to about $10^{-1}$ M ammonium dihydrogen phosphate aqueous solution.

11. The electrochemical method for manufacturing an iron-doped lithium phosphate thin film of claim 8, wherein the electrodeposition solution comprises about $10^{-3}$ M to about $5*10^{-3}$ M ferrous ammonium sulfate aqueous solution.

12. The electrochemical method for manufacturing an iron-doped lithium phosphate thin film of claim 8, wherein the drying temperature is about 40° C. and the relative humidity is about 85%.

13. The electrochemical method for manufacturing an iron-doped lithium phosphate thin film of claim 8, wherein the conductive substrate is a conductive fabric, a transparent conductive substrate, a metal substrate, or a metal oxide substrate.

14. The electrochemical method for manufacturing an iron-doped lithium phosphate thin film of claim 13, wherein the transparent conductive substrate is an FTO/glass substrate, an ITO/glass substrate, or an ITO/PEN substrate.

15. The electrochemical method for manufacturing a lithium iron phosphate thin film of claim 13, wherein the metal substrate is a platinum substrate or a stainless steel substrate.

* * * * *